Oct. 24, 1967  V. H. AMES ETAL  3,348,639
INDUSTRIAL BRAKE
Filed May 11, 1965  3 Sheets-Sheet 2
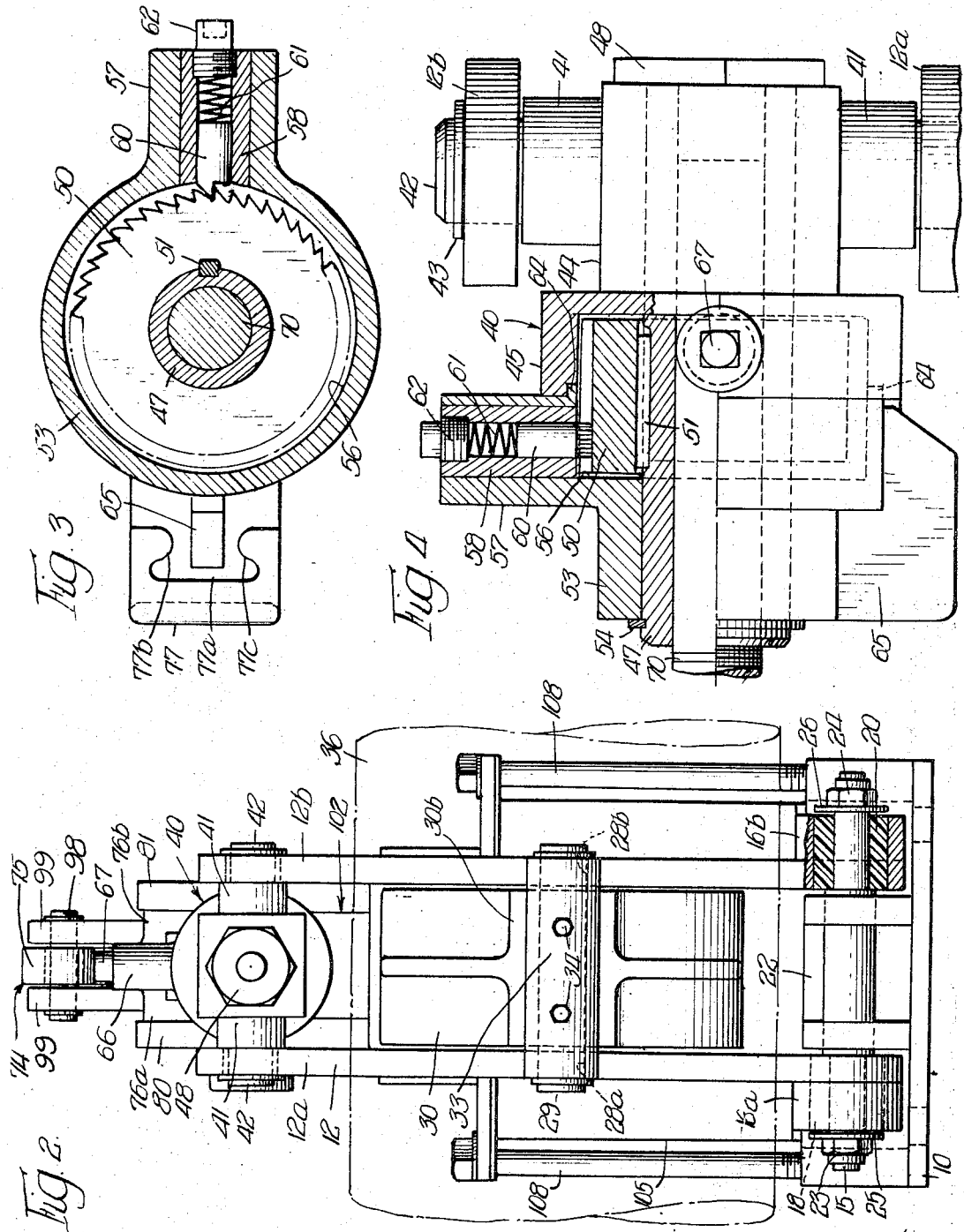
Inventors:
Victor H. Ames,
Robert T. Fischer,
By Greist, Lockwood, Greenawalt & Drury.
Attys.

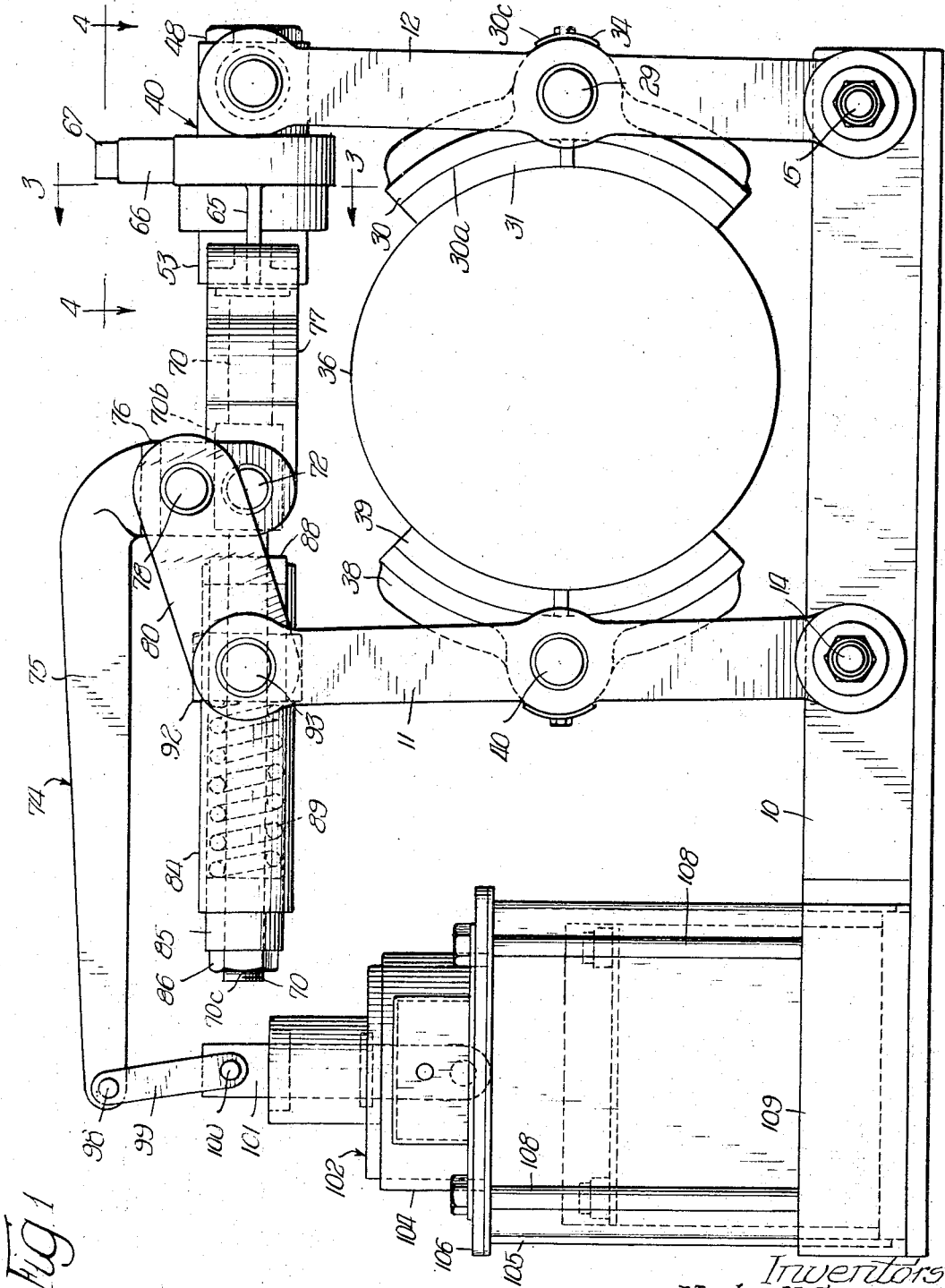

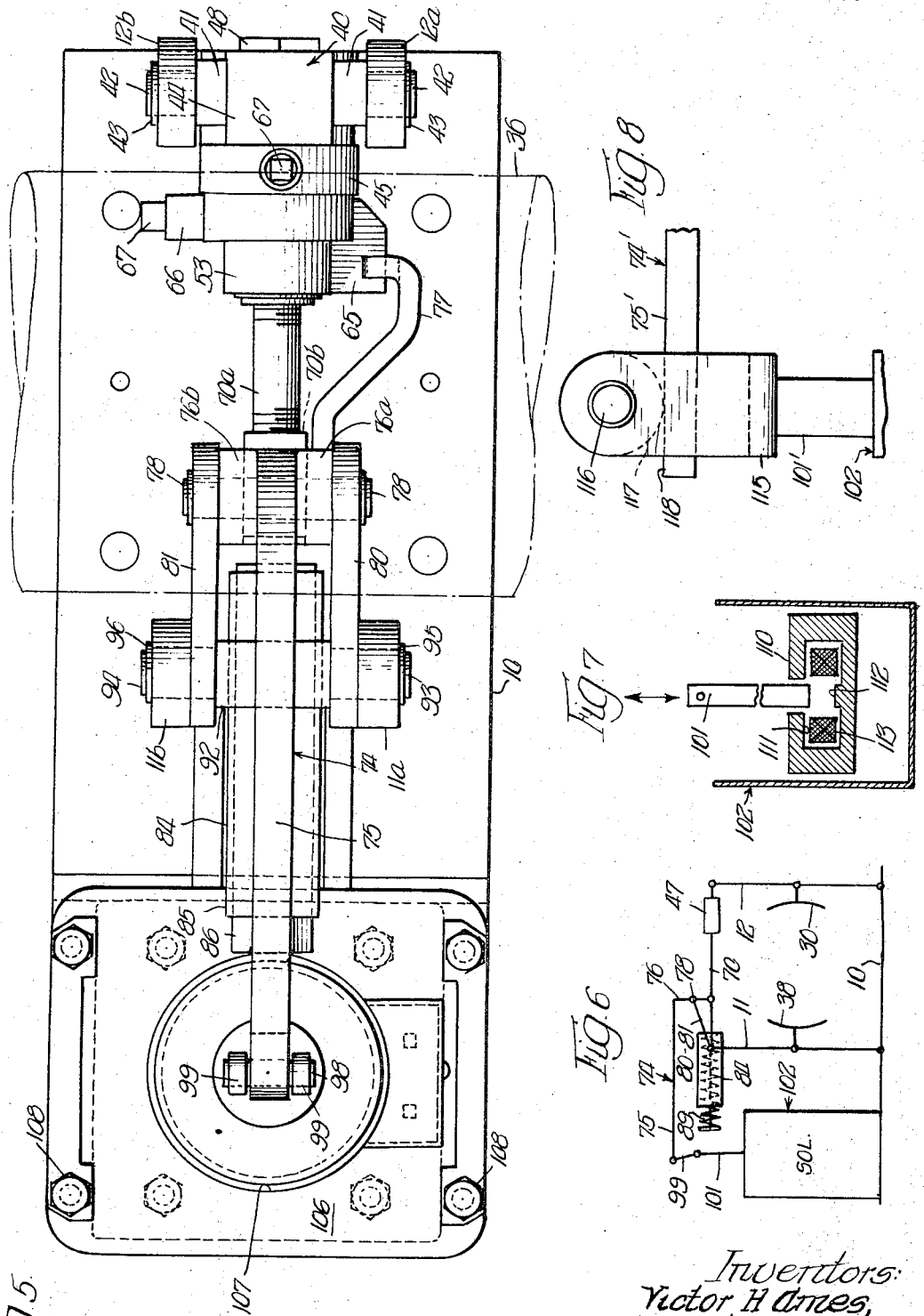

United States Patent Office 3,348,639
Patented Oct. 24, 1967

3,348,639
INDUSTRIAL BRAKE
Victor H. Ames, Midlothian, and Robert T. Fischer, Harvey, Ill., assignors to Whiting Corporation, a corporation of Illinois
Filed May 11, 1965, Ser. No. 454,811
12 Claims. (Cl. 188—171)

ABSTRACT OF THE DISCLOSURE

A pair of parallel, generally vertically extending arms each have their lower end pivotally mounted to a base. Each arm carries a brake shoe intermediate the ends thereof, the two shoes being arranged to engage a shaft at diametrically oppositely disposed locations on the latter. A linkage means is pivotally engaged with the upper ends of the two arms. A spring is associated with such linkage means for drawing the upper ends of the arms together thereby to force the shoes into braking engagement with the shaft. The shoes are released by a solenoid which is associated with the linkage mechanism. The linkage means includes automatically operating takeup or foreshortening means for drawing the upper ends of the arms together as the brake shoes wear. This automatic adjustment feature maintains the stroke of the solenoid substantially constant throughout the life of the brake shoe linings.

---

This invention relates to industrial brakes, and more particularly to a spring-applied, solenoid-released brake which automatically compensates for brake shoe wear thereby to protect the solenoid and to bring about substantially uniform braking forces during the life of the brake shoe linings without adjusting the brake spring.

By way of introduction, the brake of this invention relates to industrial brakes of the "fail safe" type which are used in industrial applications, such as applications with elevators, hoists and the like. Brakes of this type are usually spring-set and automatically released by electromagnetic, hydraulic, or pneumatic means. By "fail safe" is meant that if the automatic release means fail for any reason, the spring acts automatically to apply the brake.

The present invention is particularly directed to an industrial brake which utilizes a solenoid for releasing the brake. The brake of this invention includes a base pivotally supporting a pair of brake arms which in turn support respective brake shoes for braking engagement with a rotatable cylindrical member, such as a shaft or drum, at generally diametrically oppositely disposed locations on the latter. The free or movable extremities of the brake arms are associated with spring means in such a way that the latter acts to force the arms toward each other and thereby force the shoes into engagement with the rotatable member to provide the braking action.ABrams Lever means are also associated with the free ends of the brake arms, which lever means are operated by a solenoid for acting in opposition to the spring means thereby to spread the brake arms and release the shoes from the rotatable member.

As it is known to those skilled in the art, during operation of such a brake the shoe linings wear and this causes an increase in the amount of movement of the brake arms and associated linkage thereby increasing the stroke of the plunger of the solenoid. If the linkage is not adjusted in some manner, the stroke of the solenoid plunger will progressively increase during wear of the shoes and result in burn-out of the solenoid. The present invention has to do with new and improved self-adjusting means for maintaining the stroke of the solenoid substantially constant throughout the life of the brake shoe linings thereby to protect the solenoid and thereby substantially reduce the possibility of solenoid failure. An attendant advantage of the present invention is that substantially uniform braking forces are provided during the life of the shoes without adjusting the brake spring.

A primary object of the present invention is the provision of an industrial brake having new and improved self-adjusting means to compensate for brake shoe wear.

Another object of the present invention is the provision of an idustrial brake of the type described, wherein the adjustment means thereof includes two elements threadingly engaged with each other and also means for periodically threading one element along the other in an automatic manner in response to wear of the brake shoes.

A further object of the present invention is the provision of a self-adjusting industrial brake of the type described which is uniquely associated with an oil immersed solenoid for protecting the latter against failure by burnout.

Still another object of the present invention is the provision of a new and improved industrial brake having simple but unique means for insuring uniform separation of both brake shoes from the cylindrical member to which the braking force is applied.

Yet another object of the present invention is the provision of an industrial brake of the type described which includes new and improved means for yieldably maintaining the faces of the brake shoes uniformly spaced from the cylindrical member when the brake is released.

These and other objects and advantages of the present invention will be apparent from the following specification disclosing a preferred embodiment which is illustrated in the accompanying drawings wherein:

FIG. 1 is a side elevation of the prefered embodiment of the industrial brake of this invention;

FIG. 2 is an end elevation of the brake of FIG. 1 as seen from the right hand end thereof;

FIG. 3 is an enlarged section taken along line 3—3 of FIG. 1;

FIG. 4 is an enlarged plan view taken along line 4—4 of FIG. 1 with certain parts being shown in section;

FIG. 5 is a top plan view of the brake;

FIG. 6 is a line diagram of the brake;

FIG. 7 is a vertical section, largely in diagrammatic form, of the oil immersed solenoid forming a part of the brake; and FIG. 8 is a fragmentary side elevation of a modified connection between the solenoid plunger and the operating lever of the brake.

Referring now to the drawings and in particular to FIGS. 1 and 5, the industrial brake of this invention will be seen to include a generally rectangular base 10. The base is suitably adapted for being secured to supporting structure of the particular device with which the brake is to be associated. A pair of generally vertically disposed brake arms 11 and 12 have the lower ends thereof mounted to the base for pivoting movement about axes defined by pivot pins 14 and 15, respectively. FIG. 2 illustrates arm 12 in end elevation and the pivotal mounting of the same on the base member. It will be understood that brake arm 11 is an opposite hand version of arm 12 and is mounted to the base by the same construction pivotally mounting arm 12.

From FIG. 2 it will be seen that arm 12 consists of parallel, spaced members 12a and 12b which are identical with each other. Arms 12a and 12b have respective hubs 16a and 16b secured thereto at the lower ends of the arms. Arm 12a and hub 16a have aligned bores in which a resilient sleeve 18 is snugly fitted. In like manner, arm 12b and hub 16b include aligned openings in which is received a resilient sleeve 20. Sleeves 18 and 20 receive opposite ends of pins 15, which pin is suitably secured by a bracket arrangement 22 mounted to base 10. Opposite ends of pin 15 are threaded and receive nuts 23, 24 and associated washers 25, 26 thereby securing arms 12a, 12b on pivot pin 15.

Resilient sleeves 18 and 20 act to urge arm 12 in a clockwise direction as viewed in FIG. 1. This is achieved by dimensioning the sleeves so that they fit snugly in the annular spaces defined by the pin and the bores in the arms and the hubs and by assembling the various parts in such a manner that when the sleeves are in their normal configuration, i.e. not twisted or otherwise deformed, the arm 12 is inclined from the vertical to the right of the position thereof illustrated in FIG. 1. Accordingly, when arm 12 is moved to the vertical position, sleeves 18 and 20 are deformed or twisted and by reason of their resilient properties tend to resume their original or normal shape and in so doing urge the arm 12 to the inclined position mentioned above. It will be understood that the resilient sleeves supporting arm 11 act to urge the same in a counterclockwise direction as viewed in FIG. 1 with the same force urging arm 12 in a clockwise direction. As will become apparent herein, this resilient mounting of arms 11 and 12 causes uniform separation of the brake shoes from the cylindrical surface of the member to which the braking forces are applied.

Arms 12a, 12b include respective, aligned bores 28a, 28b intermediate their ends, which bores receive opposite ends of a pin 29. This pin pivotally supports a brake shoe 30, which brake shoe includes an arcuate face 30a to which a suitable brake lining 31 is secured. Shoe 30 has an integral portion 30b including a bore receiving pin 29. Portion 30b includes an arcuate surface 30c which is arranged for alignment with integral arcuate formations on the outside edges of arms 12a and 12b. An arcuate in cross-section spring plate 33 is secured to shoe 30 by means of suitable fasteners 34 (FIG. 2). Opposite ends of the spring plate engage the arcuate formations on the outside edges of arms 12a and 12b thereby yieldably supporting shoe 30 from arm 12. Spring plate 33 permits limited pivoting movement of the shoe about pin 29 when the former is brought into engagement with cylindrical member 36 and the spring plate acts to support the shoe with the face of the lining uniformly spaced from the surface of cylindrical member 36 when the brake is released, thereby to prevent cocking of the shoe and attendant dragging of the same.

A shoe 38 having a lining 39 is pivotally carried by a pin 40 supported by arm 11. It will be understood that shoe 38 is identical with shoe 30 and supported from arm 11 by the same construction just described with respect to shoe 30 and arm 12.

Referring to FIG. 4, a housing 40 will be seen to include oppositely extending hubs 41 having reduced in diameter extensions 42 received in openings in the upper ends of arms 12a and 12b, respectively. Spring retainers 43 prevent separation of the arms from extensions 42. Housing 40 also includes a hollow cylindrical portion 44 and coaxial, enlarged, hollow cylindrical portion 45. Housing portion 44 rotatably supports one end of an internally threaded sleeve 47. A member 48 in the nature of a nut is secured to the end of sleeve 47 which is journaled in housing portion 44; member 48 rotatably engages the outside surface of housing portion 44 and prevents axial movement of the sleeve relative to the housing when the former is moved to the left as viewed in FIG. 4.

An annular gear or ratchet wheel 50 is mounted on sleeve 47 intermediate the ends thereof, and this wheel is keyed to the sleeve by means of a key 51 fitted within suitably aligned recesses in the sleeve and in the ratchet wheel. As noted in FIG. 4, a portion of this ratchet wheel extends into housing portion 45.

An annular member 53 is rotatably mounted on sleeve 47 in adjacent relation with housing portion 45. A ring 54 seated in a groove in sleeve 47 abuts annular member 53. Annular member 53 includes an annular cavity 56 which receives a portion of ratchet wheel 50. It should be apparent that member 48 and ring 54 prevent axial movement of sleeve 47 with respect to housing 40 and annular member 53. It will be recalled that sleeve 47 is rotatably supported by housing 40 and that annular member 53 is in turn mounted on sleeve 47 for rotation relative to the latter.

Annular member 53 includes an integral, radially extending, sleeve-like portion 57 which opens into annular cavity 56. A sleeve 58 is fitted within portion 57. Sleeve 58 slidably supports a pawl 60, which pawl engages the teeth of ratchet wheel 50 as illustrated in FIG. 3. A spring 61 engages the pawl; spring 61 is held in place by means of a plug 62 which is threaded in the outer end of sleeve 58.

Referring back to FIG. 4, annular member 53 will be seen to include an annular extension 64 which extends into the annular space defined by the outside of ratchet wheel 50 and the inside of housing portion 45. This extension rotatably engages the inside wall of housing portion 45 and aids to prevent dirt from entering and grease from leaving the chamber defined by housing 40 and annular member 53. Annular member 53 also includes an integral, radially extending, flat projection 65.

As best noted in FIGS. 1 and 3, housing portion 45 includes an integral, vertically extending cylindrical portion 66. This cylindrical portion supports a sleeve, pawl, spring and plug substantially identical in construction with the corresponding parts illustrated in FIG. 4, and therefore these parts within portion 66 are not illustrated herein. A plug 67, which is identical with plug 62, is shown in FIGS. 1, 2, 4 and 5. It will be understood that the pawl supported in housing portion 66 engages the teeth of ratchet wheel 50 to prevent rotation of the latter in a counterclockwise direction as viewed in FIG. 3.

A rod 70 has a threaded end 70a threadingly received in sleeve 47. The threads on sleeve 47 and rod 70 are formed so that when the sleeve is rotated in a clockwise direction (as viewed in FIG. 3) the sleeve is advanced along the rod, i.e. moved from right to left as seen in FIGS. 1, 3 and 4. Rod 70 also includes an integral, enlarged cylindrical portion 70b intermediate its ends. This enlarged portion includes a diametrically disposed bore receiving a pin 72.

A lever, generally designated 74, has a long leg 75 and a short leg 76 at a right angle therewith. The short leg of the lever is bifurcated forming ears 76a and 76b (FIG. 5). These ears include aligned bores in their lower ends, which bores receive opposite ends of pin 72 thereby pivotally mounting lever 74 on rod 70. Lever 74 includes suitable aligned bores supporting a pin 78 in parallel, vertically spaced relation with pin 72. Opposite ends of pin 78 are received in aligned bores in a pair of identical links 80 and 81.

As best seen in FIGS. 1, 3 and 5, lever 74 includes an extension 77 extending integrally from ear 76a. Extension 77 includes a recess 77a defining opposed formations 77b and 77c which are adapted for alternate engagement with projection 65. As will be explained in greater detail below, during actuation and release of the brake of this invention, formations 77b and 77c alternately strike projection 65 for oscillating annular member 53.

Rod 70 extends through a tube 84 in coaxial relation therewith. Rod 70 includes a threaded end 70c having a nut 85 threaded thereon. As noted in FIG. 1, a portion of this nut extends within the tube 84. It will be understood that nut 85 clears the inside wall of the tube so that the former may be threaded on rod 70. A jam nut 86 is also threaded on rod 70 in abutting relation with nut 85 for locking the latter.

An annular member 88 is secured in the other end of tube 84, which annular member slidably receives rod 70. A coil spring 89 encircles rod 70 and is housed in tube 84 with opposite ends of the spring in abutting engagement with annular member 88 and nut 85, respectively. It will be understood that spring 89 acts to force rod 70 to the left relative to tube 84, or stated another way, to force tube 84 to the right relative to rod 70. Nut 85 provides a means for adjusting the tension of spring 89.

Tube 84 is mounted in a bore formed in a block 92, which block includes integral, oppositely extending pin portions 93 and 94. Pin portions 93 and 94 are received within aligned openings in the lower ends of links 80 and 81, respectively; pin portions 93 and 94 are also received within aligned openings in the upper ends of arms 11a and 11b, respectively. Suitable spring retainers 95 and 96 are removably mounted on the outer ends of respective pin portions 93 and 94 for preventing separation of the various arms and links.

The free end of leg 75 of lever 74 mounts a pin 98 having its opposite ends received in bores formed in the upper ends of a pair of links 99. The lower ends of these links receive opposite ends of a pin 100, which pin is received in the bore of a plunger 101 forming a part of a solenoid 102.

The solenoid includes an upper housing portion 104 and an adjacent lower housing portion 105. A locking plate 106, having a central opening 107 (FIG. 5) for receiving housing portion 104, rests on the top of housing portion 105. Plate 106 is drawn down on housing portion 105 by a number of bolts 108, which bolts have their lower ends threadingly received in suitable structure 109 secured to base 10. It will be appreciated that solenoid 102 may be readily moved for repair or replacement by removing bolts 108 and either pin 98 or pin 100.

Solenoid 102, which of itself forms no part of the present invention, is illustrated diagrammatically in FIG. 7. The solenoid includes a laminated iron yoke 110 of E-shaped cross-section defining an annular cavity 111 and a centrally disposed raised surface 112. A coil 113 is mounted within the yoke 111. Plunger 101 is suitably mounted for vertical reciprocal movement. Upon energizing of the solenoid, plunger 101 is drawn within the yoke until the lower end of the former contacts raised surface 112. Upon de-energizing of the solenoid, plunger 101 is free to be withdrawn from the yoke. The solenoid is designed so that optimum performance is obtained with a predetermined stroke of movement of plunger 101.

As is known to those skilled in the art, the solenoid described relies on heavy inrush current in order to draw the plunger thereof into the coil. As the plunger enters the coil the impedance of the solenoid circuit increases rapidly and as the leading end of the plunger comes into contact with raised surface 112 the impedance rises even more. The increasing impedance acts to protect the coil against burn-out when the same is subjected to inrush current. If the plunger is prevented from being drawn into the coil, as for example if the plunger is withdrawn to such an extent that it cannot be drawn into the yoke, the inrush current continues to flow thereby resulting in burn-out of the coil.

As will be explained hereinbelow, the stroke of the solenoid plunger is increased as the linings of the brake shoes wear during use. However, the self-adjusting feature of the brake of this invention acts to prevent the stroke of the solenoid from exceeding a predetermined amount. Or in other words, the self-adjusting feature of this invention acts to maintain the stroke of movement of the plunger within a range of movement whereby the latter will always be drawn into the yoke of the solenoid thereby to prevent solenoid burn-out.

Solenoid 102 is preferably of the oil immersed type. The oil is at a level such that raised portion 112 is immersed. When the plunger approaches raised portion 112, the oil is of course forced from the space between the leading end of the plunger and the raised surface of the yoke. As the oil is forced across raised surface 112, it acts to remove any dirt or other foreign material thereby to permit good contact between the plunger and the yoke. As explained above, contact of the plunger with the yoke causes an impedance rise for aiding in preventing solenoid burn-out. The oil reduces the shock which results from the plunger striking raised portion 112 of the yoke. The oil also acts to transfer heat from the coil to atmosphere.

It is believed that operation of the brake of this invention can best be understood by referring to FIG. 6. Assuming that the solenoid is de-energized, spring 89 acts to pull rod 70 to the left and to force tube 84 to the right thereby to urge the upper ends of arms 11 and 12 together; this action causes the brake shoe 30 and 38 to be forced against the surface of cylindrical member 36 thereby to apply a braking force to the latter. It will be recalled that tube 84 is pivotally associated with the upper end of arm 11 and that rod 70 is pivotally associated (via sleeve 47 and housing 40) with the upper end of arm 12. When the spring acts as just described, it will be noted that lever 74 is pivoted in a clockwise direction about pin 78. During this movement of lever 74, the free end of leg 75 is raised thereby to withdraw plunger 101 from the solenoid.

When solenoid 102 is energized, plunger 101 is drawn downwardly into the yoke thereby to rotate lever 74 in a counterclockwise direction about pin 78. This movement of lever 74 causes rod 70 to be moved to the right and tube 84 to be moved to the left thereby compressing spring 89 and forcing or spreading the upper ends of arms 11 and 12 apart. This movement of the arms causes the brake shoes to be released from the surface of cylindrical member 36. Separation of linings 31 and 39 from the surface of the cylindrical member is uniform by reason of the unique pivotal mounting at the lower ends of arms 11 and 12 as explained above. The amount of movement of brake linings 31 and 39 away from the cylindrical member is limited by contact of the leading end of plunger 101 with raised portion 112 of the solenoid yoke.

Upon de-energizing of the solenoid, spring 89 acts to move the various parts in the manner described above until linings 31 and 39 of the shoes are firmly seated against the surface of cylindrical member 36. In other words, the engagement of the brake linings with the surface of the cylindrical member limits movement of arms 11 and 12 toward each other and thereby also limits the amount of clockwise rotation of lever 74. Accordingly, it will be apparent that as linings 31 and 39 wear during operation of the brake, lever 74 will be swung a greater amount in a clockwise direction thereby withdrawing the plunger a greater distance from the solenoid yoke 110.

It will be recalled that extension 77 is integral with lever 74. Therefore, extension 77 oscillates or moves along with the lever. Upon energizing of the solenoid, lever 74 is moved in a counterclockwise direction and formation 77c strikes the undersurface of projection 65 thereby to rotate annular member 53 in a clockwise direction as viewed in FIG. 3. When the solenoid is de-energized, spring 89 acts to rotate lever 74 in a clockwise direction whereupon formation 77b strikes the upper surface or projection 65 for rotating annular member 53 in a counterclockwise direction as viewed in FIG. 3. Annular member 53 carries pawl 60 which acts in cooperation with the teeth of ratchet wheel 50 for rotating the latter. When brake shoe linings 31 and 39 wear to such an extent that the oscillation of extension 77 is increased to oscillate annular member 50 through an arc great enough to permit pawl 60 to engage the next tooth on ratchet wheel 50, the latter will be rotated (clockwise with reference to FIG. 3) through an arc equal to 360° divided by the number of teeth on the ratchet wheel. Ratchet wheel 50 is keyed to sleeve 47 and therefore causes rotation of the latter. Sleeve 47 is threaded on rod 70 and moves along the latter, i.e. to the left as seen in the drawings, during its rotation by ratchet wheel 50.

Ratchet wheel 50 is rotated by pawl 60 during withdrawal of the shoes, i.e. during energizing of solenoid 102. When the ratchet wheel and sleeve are rotated as just described, rod 70 and sleeve 47 are in effect drawn toward each other thereby causing lever 74 to be rotated in a counterclockwise direction about pin 78 for lowering the plunger and reducing its stroke.

It should now be understood that the action of the self-adjusting means, i.e. the threading engagement between rod 70 and sleeve 47, compensates for brake lining wear and maintains the stroke of movement of solenoid plunger 101 with a range safely within the design capability of the solenoid. It should be apparent that manual adjustment of the brake shoes is made possible by manipulating member 48.

Thus, the self-adjusting feature of the brake of this invention permits safe and reliable operation of the brake with an A.C. solenoid. The self-adjusting feature of the present invention has the attendant advantage of obviating periodic adjustment of the linkage to compensate for brake lining wear. Without this feature it would be necessary to adjust nut 85 periodically to maintain sufficient spring tension for providing the desired braking forces.

FIG. 8 illustrates a modified connection between the solenoid plunger and lever 74 to permit even more ready separation of the solenoid. The parts illustrated in FIG. 8 which correspond to the parts already described are identified by the prime form of numeral.

The upper end of plunger 101' is secured to the lower end of a U-shaped member 115. The U-shaped member includes upwardly extending ears having aligned bores receiving opposite ends of a pin 116, which pin supports a roller 117. The roller engages and rolls on a flat upper surface 118 formed by providing leg 75' with a suitable extension. With this form of connection between the solenoid and lever 74, it will be apparent that upon unfastening bolts 108 the solenoid may be readily removed for repair and/or replacement.

While the invention has been shown in but one form, it will be obvious to those skilled in the art that it is not to be so limited. On the contrary, the invention is susceptible of various forms and modifications without departing from the spirit and scope of the appended claims.

We claim:

1. A brake apparatus for arresting rotation of a cylindrical member comprising, a base, a pair of brake arms each having one of its ends pivotally mounted to said base, a pair of brake shoes pivotally supported by said arms, respectively, intermediate the ends of the latter and arranged for engaging said cylindrical member at generally diametrically oppositely disposed locations thereon, two coaxial elements connected together by adjustment means for axial movement toward each other upon operation of the adjustment means, one of said elements being pivotally connected to one of said arms adjacent the other end thereof, biasing means pivotally associated with the other arm adjacent the other end thereof, which biasing means is also associated with the other of said elements for forcing said other ends of said arms together thereby to urge said shoes into engagement with said cylindrical member, lever means associated with said other element and said biasing means and being movable in one direction during movement of said shoes into braking engagement with said cylindrical member, said lever means being movable in another direction for acting in opposition to said biasing means and thereby releasing said shoes, the amount of movement of said lever means in either direction being directly proportional to the amount of movement of said shoes between their release and braking positions, means for moving said lever means in said another direction, said lever means including means engageable with said adjustment means for operating the latter when the lever means moves a predetermined amount thereby to limit maximum movement of said lever means to said predetermined amount.

2. A brake apparatus for arresting rotation of a cylindrical member comprising, a base, a pair of brake arms each having one of its ends pivotally mounted to said base, a pair of brake shoes pivotally supported by said arms, respectively, intermediate the ends of the latter and arranged for engaging said cylindrical member at generally diametrically oppositely disposed locations thereon, first means pivotally connected to one of said arms adjacent the other end thereof and supporting ratchet wheel means for rotation in one direction, a rod having one end thereof threadingly engaged with said ratchet wheel means so that movement of the latter in said one direction advances the same along the rod, biasing means pivotally connected to the other arm adjacent the other end thereof, which biasing means is associated with said rod for forcing said other ends of said arms together thereby to urge said shoes into engagement with said cylindrical member, pawl means rotatably mounted on said ratchet wheel means for rotating the latter in said one direction upon oscillation of the pawl means through a predetermined arc, lever means associated with said rod and said biasing means, which lever means is movable in a first direction for spreading said other ends of said arms thereby to release said shoes from said cylindrical member, said biasing means serving to urge said lever means in a second direction opposite said first direction when urging said shoes into engagement with said cylindrical member, actuating means for moving said lever means in said first direction, the amount of movement of said lever means in either direction being directly proportional to the amount of movement of said shoes between their release and braking positions, said lever means including means engageable with said pawl means for oscillating the latter through said predetermined arc when the lever means moves a predetermined amount, thereby to limit maximum movement of said lever means to said predetermined amount.

3. A brake apparatus for arresting rotation of a cylindrical member comprising, a base, a pair of brake arms each having one of its ends pivotally mounted to said base, a pair of brake shoes pivotally supported by said arms, respectively, intermediate the ends of the latter and arranged for engaging said cylindrical member at generally diametrically oppositely disposed locations thereon, a cylindrical housing pivotally connected to one of said arms adjacent the other end thereof and mounting a sleeve for rotation in one direction, which sleeve is threaded along at least a portion of the interior thereof, an annular formation of ratchet teeth secured to said sleeve, an annular member coaxial with said annular formation and supported for rotation independently of said sleeve, a spring biased pawl carried by said annular member and adapted to act in cooperation with the ratchet teeth to rotate said sleeve in said one direction upon oscillation of said annular member through a predetermined arc, a rod having one end thereof threadingly engaged with said sleeve so that rotation of the latter in said one direction causes the same to advance along the rod, biasing means pivotally connected to the other arm adjacent the other end thereof, which biasing means is associated with said rod for forcing said other ends of said arms together thereby to urge said shoes into engagement with said cylindrical member, lever means associated with said rod and said biasing means, which lever means is movable in a first direction for spreading said other ends of said arms thereby to release said shoes from said cylindrical member, said biasing means serving to urge said lever means in a second direction opposite said first direction when urging said shoes into engagement with said cylindrical member, actuating means for moving said lever means in said first direction, the amount of movement of said lever means in either direction being directly proportional to the amount of movement of said shoes between their release and braking positions, said lever means including means engageable with said annular member for oscillating the latter through said predetermined arc when the lever means moves a predetermined amount, thereby to limit maximum movement of said lever means to said predetermined amount.

4. The brake apparatus according to claim 3 wherein said actuating means comprises an oil immersed solenoid.

5. The brake apparatus according to claim 3 further defined by, said arms and said lever means being substantially disposed and movable in a common plane perpendicular to the axis of said cylindrical member, said lever means including a lever pivoted to said rod about a first axis perpendicular to said plane, said lever means further including a link, which link has one end thereof pivoted to said lever about an axis parallel with and adjacent to said first axis, and which link has the other end pivoted to said other arm about a third axis parallel to said first axis.

6. A brake apparatus for arresting rotation of a cylindrical member comprising, a base, a pair of brake arms disposed one on each side of said member and each having one of its ends pivotally mounted to said base about an axis parallel with the axis of rotation of said cylindrical member, a pair of brake shoes pivotally supported by said arms, respectively, intermediate the ends of the latter and arranged for engaging said cylindrical member at generally diametrically oppositely disposed locations thereon, a cylindrical housing pivotally connected to one of said arms adjacent the other end thereof for pivoting movement relative thereto about an axis parallel with said axes, which housing has its longitudinal axis at a right angle to its axis of pivot, a sleeve coaxial with said housing and rotatably mounted therein, which sleeve is threaded along at least a portion of the interior thereof and includes an annular formation of ratchet teeth on the exterior thereof, an annular member coaxial with said annular formation and supported for rotation independently of said sleeve, a spring biased pawl carried by said annular member and adapted to act in cooperation with the ratchet teeth to rotate said sleeve in one direction upon oscillation of said annular member through a predetermined arc, means for preventing rotation of said sleeve in a direction opposite said one direction, a rod having one end thereof threadingly engaged with said sleeve so that rotation of the latter in said one direction causes the same to advance along the rod, biasing means pivotally connected to the other arm adjacent the other end thereof for movement relative thereto about an axis parallel with said axes, which biasing means is connected to said rod for moving said other ends of said arms together thereby to force said shoes into braking engagement with said cylindrical member, lever means connected to said rod and associated with said biasing means, which lever means is movable in a first direction for spreading said other ends of said arms thereby to release said shoes from said cylindrical member, said biasing means serving to urge said lever means in a second direction opposite said first direction upon forcing said shoes into braking engagement with said cylindrical member, actuating means for moving said lever means in said first direction, the amount of movement of said lever means in either direction being directly proportional to the amount of movement of said shoes between their braking and release positions, said lever means including means engageable with said annular member for oscillating the latter through said predetermined arc when the lever means moves a predetermined amount thereby to limit movement of said lever means to said predetermined amount.

7. The brake apparatus according to claim 6 further defined by, said lever means including a lever and a link pivotally connected to each other and to said rod and said other arm, respectively, said annular member having a projection thereon, and said arm having an extension with a recess in which said projection is received.

8. The brake apparatus according to claim 6 wherein said actuating means comprises an oil immersed solenoid.

9. An industrial brake of the type including a pair of arms having corresponding ends connected to fixed pivots and respectively carrying a pair of shoes for braking engagement with a cylindrical member at generally diametrically oppositely disposed locations on the latter, the improvement comprising, rod means having one end thereof pivotally connected to the other end of one of said arms, which rod means includes a rod associated with adjustment means adapted upon actuation to shorten the length of the rod means, biasing means pivotally connected with the other end of the other arm and connected to said rod means adjacent the other end thereof for forcing said shoes into braking engagement with said cylindrical member, linkage means connected with said rod means and said biasing means, said linkage means including a lever adapted in one position thereof to release said shoes and adapted to be moved to another position by the action of said biasing means in forcing said shoes into braking engagement with said cylindrical member, the distance between said positions being directly proportional to the distance between the release and braking positions of said shoes, a solenoid having the plunger thereof connected to said lever and arranged so that upon energizing the lever is moved to said one position, said linkage means including an extension movable with said lever and adapted, when movement of said lever between said positions exceeds a predetermined amount, to actuate said adjustment means.

10. The improvement according to claim 9 wherein said adjustment means includes, a sleeve threaded on said rod, ratchet means for threading the sleeve along the rod, said ratchet means being actuated by said extension when said lever moves between said positions in excess of said predetermined amount.

11. The apparatus according to claim 1 further defined by, separate spring means carried by said arms, respectively, and engaged with the associated shoes adjacent the pivotal supports therefor for yieldably holding and maintaining the shoes with their braking faces uniformly spaced from the surface of the cylindrical member when the former are disengaged from the latter.

12. The improvement according to claim 9 further defined by, said shoes being pivotally supported on said arms intermediate the ends of the latter, separate spring means carried by said arms, respectively, and engaged with the associated shoes adjacent the pivotal supports therefor for yieldably holding and maintaining the shoes with their braking surfaces uniformly spaced from the surface of the cylindrical member when the former are disengaged from the latter.

References Cited
UNITED STATES PATENTS

| | | |
|---|---|---|
| 867,483 | 10/1907 | Darlington. |
| 1,685,997 | 10/1928 | Halfverson _____ 188—171 |
| 2,150,631 | 3/1939 | Piron _____ 188—216 X |
| 2,436,880 | 3/1948 | Burgett _____ 188—171 |
| 3,032,146 | 5/1962 | Szabo et al. _____ 188—75 X |
| 3,219,155 | 11/1965 | Kohli _____ 188—171 |

DUANE A. REGER, *Primary Examiner.*